US012638209B2

(12) United States Patent
Wilson et al.

(10) Patent No.: US 12,638,209 B2
(45) Date of Patent: May 26, 2026

(54) HVAC TERMINAL UNIT SYSTEMS AND METHODS

(71) Applicant: Johnson Controls Technology Company, Auburn Hills, MI (US)

(72) Inventors: Timothy J. Wilson, Saint Petersburg, FL (US); Christian C. Herbeck, Largo, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 1804 days.

(21) Appl. No.: 16/378,310

(22) Filed: Apr. 8, 2019

(65) Prior Publication Data

US 2020/0292197 A1 Sep. 17, 2020

Related U.S. Application Data

(60) Provisional application No. 62/817,957, filed on Mar. 13, 2019.

(51) Int. Cl.
*F24F 11/74* (2018.01)
*F24F 5/00* (2006.01)
(Continued)

(52) U.S. Cl.
CPC ............ *F24F 11/74* (2018.01); *F24F 5/0007* (2013.01); *F24F 11/30* (2018.01); *F24F 11/54* (2018.01);
(Continued)

(58) Field of Classification Search
CPC ............ F24F 11/74; F24F 11/30; F24F 11/54; F24F 5/0007; F24F 11/63; F24F 2110/10;
(Continued)

(56) References Cited

U.S. PATENT DOCUMENTS 4,100,938 A * 7/1978 Dravnieks ............... F16K 47/14
251/118
4,627,569 A * 12/1986 Morris .................. F24F 3/0442
236/49.4
(Continued)

FOREIGN PATENT DOCUMENTS

CN 205807681 U 12/2016
CN 206563411 U 10/2017
(Continued)

OTHER PUBLICATIONS

Fan Powered Terminal Units; Nailor 35SST Catalog, Oct. 4, 2018; pp. 1-56.

(Continued)

*Primary Examiner* — Jessica Yuen
(74) *Attorney, Agent, or Firm* — Fletcher Yoder, P.C.

(57) ABSTRACT

A terminal unit for a heating, ventilation, and/or air conditioning (HVAC) system may include a housing defining a mixing chamber. The mixing chamber may have a primary air inlet, a plenum air inlet, and a mixed air outlet, and mix a primary air flow from the primary air inlet with a plenum air flow from the plenum air inlet to form a mixed air flow that is output through the mixed air outlet to a conditioned space. The terminal unit may also include a panel adjustably coupled to the housing to adjustably occlude the plenum air inlet. The terminal unit may also include an actuator coupled to the housing and the panel to move the panel and adjust a size of an air flow path corresponding to the plenum air inlet.

12 Claims, 5 Drawing Sheets

(51) Int. Cl.

| | |
|---|---|
| *F24F 11/30* | (2018.01) |
| *F24F 11/54* | (2018.01) |
| *F24F 11/63* | (2018.01) |
| *F24F 13/10* | (2006.01) |
| *F24F 13/14* | (2006.01) |
| *F24F 13/24* | (2006.01) |
| *F24F 110/30* | (2018.01) |
| *F24F 110/40* | (2018.01) |
| *G05B 19/04* | (2006.01) |

(52) U.S. Cl.
CPC .............. *F24F 11/63* (2018.01); *F24F 13/10* (2013.01); *F24F 13/1426* (2013.01); *F24F 13/24* (2013.01); *G05B 19/04* (2013.01); *F24F 2110/30* (2018.01); *F24F 2110/40* (2018.01); *G05B 2219/2614* (2013.01)

(58) Field of Classification Search
CPC .... F24F 13/1426; F24F 13/10; F24F 2110/30; F24F 2110/40; F24F 1/00075; F24F 13/24; F24F 2221/14; F24F 13/04; G05B 19/04; G05B 2219/2614
See application file for complete search history.

(56) References Cited

U.S. PATENT DOCUMENTS

| | | | | |
|---|---|---|---|---|
| 4,836,096 A * | 6/1989 | Avery | .................... | F24F 3/044 454/238 |
| 4,942,921 A * | 7/1990 | Haessig | .................... | F24F 3/00 165/215 |
| 5,908,154 A * | 6/1999 | Sunaga | .............. | B60H 1/00842 236/49.3 |
| 5,976,010 A * | 11/1999 | Reese | ...................... | F24F 11/30 454/236 |
| 6,606,876 B1 * | 8/2003 | Giordano | ........... | B60H 1/00514 62/244 |
| 7,328,586 B2 * | 2/2008 | Gau | ........................ | F24F 13/24 62/158 |
| 9,803,883 B2 * | 10/2017 | Fan | .......................... | F24F 11/89 |
| 10,088,821 B2 | 10/2018 | Karamanos et al. | | |
| 2007/0205297 A1 * | 9/2007 | Finkam | ................... | F24F 11/30 236/1 C |
| 2013/0309956 A1 * | 11/2013 | Mouch | ................... | B60H 1/248 454/165 |

FOREIGN PATENT DOCUMENTS

| | | | | |
|---|---|---|---|---|
| CN | 108302622 A | | 7/2018 | |
| GB | 2012945 B | * | 5/1982 | .............. F24F 13/24 |
| JP | H0532943 U | * | 4/1993 | |
| KR | 101540891 B1 | | 7/2015 | |
| WO | 8911624 A1 | | 11/1989 | |

OTHER PUBLICATIONS

FDC Series Flow Fan Powered Terminal Unit; Price FDC Engineering Catalog; Price Industries Limited, Canada, 2018, pp. 1-25.

* cited by examiner

HVAC TERMINAL UNIT SYSTEMS AND METHODS

CROSS REFERENCE TO RELATED APPLICATIONS

This application claims priority from and the benefit of U.S. Provisional Application Ser. No. 62/817,957, entitled "HVAC TERMINAL UNIT SYSTEMS AND METHODS," filed Mar. 13, 2019, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system is often utilized to regulate environmental conditions, such as temperature and/or humidity, within a building or other conditioned space. For example, an HVAC system may include equipment, such as one or more heat exchangers deployed in an HVAC unit, which operates to produce temperature-controlled air. To facilitate supply of the temperature-controlled air to a conditioned space, the HVAC system may include ductwork and a terminal unit. Generally, the terminal unit includes a primary air inlet for receiving the temperature-controlled air, a plenum air inlet for receiving plenum air, such as air within a plenum or space above a ceiling in the building, and an air outlet for providing the temperature-controlled air and the plenum air to the conditioned space. However, in some scenarios, the air flows may generate sound within the terminal unit that radiates from the plenum air inlet and causes undesired noise.

SUMMARY

This section provides a brief summary of certain embodiments described in the present disclosure to facilitate a better understanding of the present disclosure. Accordingly, it should be understood that this section should be read in this light and not to limit the scope of the present disclosure. Indeed, the present disclosure may encompass a variety of aspects not summarized in this section.

The present disclosure relates to a terminal unit for a heating, ventilation, and/or air conditioning (HVAC) system may include a housing defining a mixing chamber. The mixing chamber may have a primary air inlet, a plenum air inlet, and a mixed air outlet, and mix a primary air flow from the primary air inlet with a plenum air flow from the plenum air inlet to form a mixed air flow that is output through the mixed air outlet to a conditioned space. The terminal unit may also include a panel adjustably coupled to the housing to adjustably occlude the plenum air inlet. The terminal unit may also include an actuator coupled to the housing and the panel to move the panel and adjust a size of an air flow path corresponding to the plenum air inlet.

The present disclosure also relates to a heating, ventilation, and/or air conditioning (HVAC) system that includes a terminal unit. The terminal unit may include a first air inlet, a second air inlet, an air outlet, and movable panel. The first air inlet may receive a plenum air flow from a plenum space within a building, and the movable panel may regulate a size of an air flow path through the first air inlet. The HVAC system may also include a controller to determine a desired size of the air flow path and to adjust a position of the movable panel based on the desired size of the air flow path.

The present disclosure also relates to a terminal unit having a primary air inlet to receive a primary air flow from a heating, ventilation, and/or air conditioning (HVAC) unit via ductwork. The terminal unit may also include a plenum air inlet to receive a plenum air flow from a plenum space of a building and an air outlet to discharge an output air flow from the terminal unit to a conditioned space of the building. The terminal unit may also include a plenum door panel to adjust a size of an air flow path through the plenum air inlet to reduce a noise output of the terminal unit.

BRIEF DESCRIPTION OF THE DRAWINGS

Various aspects of the present disclosure may be better understood upon reading the detailed description and upon reference to the drawings, in which.

DETAILED DESCRIPTION

Figure 1:
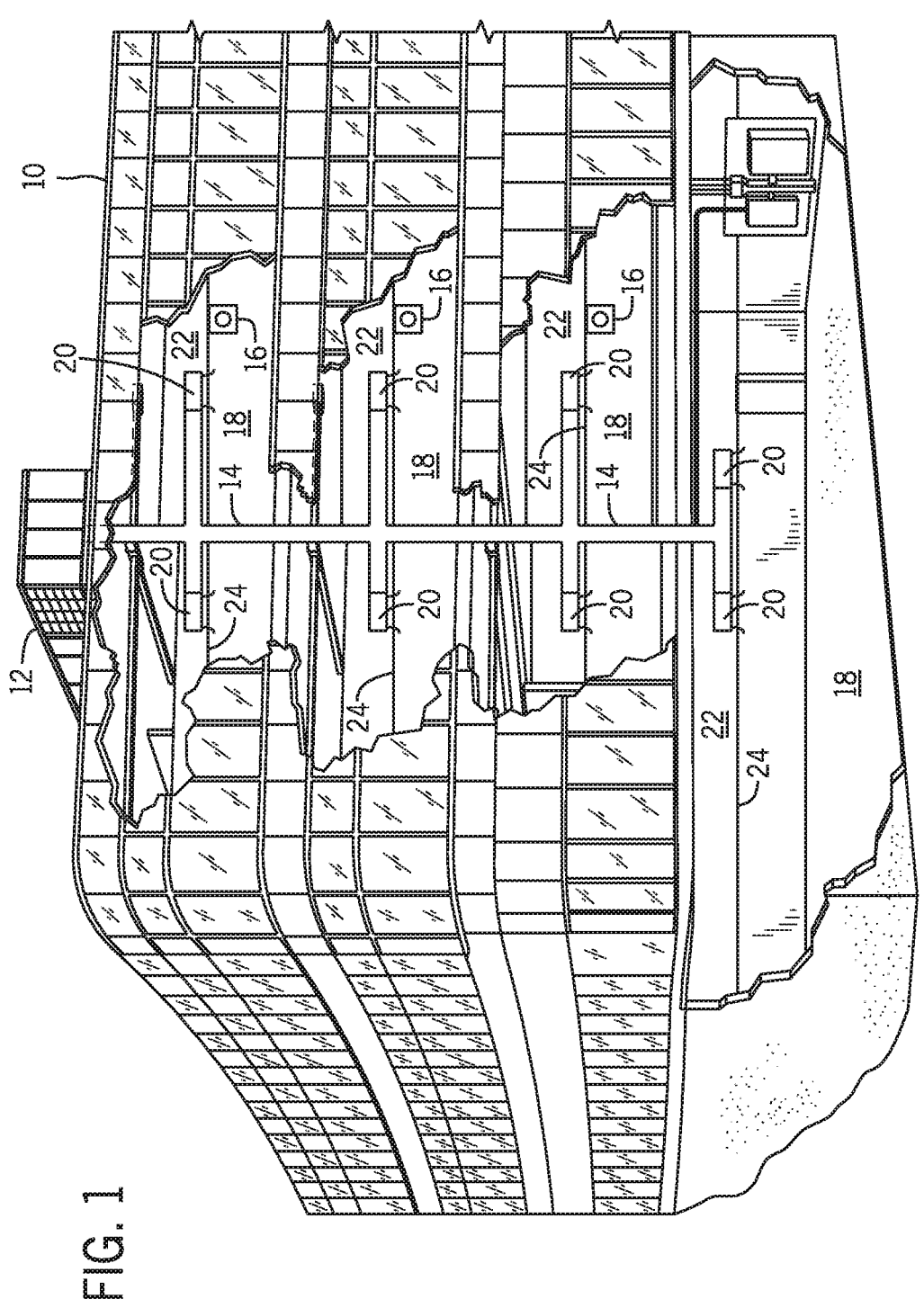
FIG. 1 is a partial cross-sectional view of an embodiment of a building that includes a heating, ventilating, and air conditioning (HVAC) system, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, a heating, ventilation, and/or air conditioning (HVAC) system, such as one including an air conditioner and/or heat pump, may include a terminal unit for delivering air to a conditioned space of a structure. In general, the terminal unit may be located near or within the conditioned space, and air flows may be facilitated to and/or from the terminal unit via ductwork. For example, the terminal unit may receive a primary air flow, via a primary air inlet, and a plenum air flow, via a plenum air inlet. The primary air flow and the plenum air flow may mix, for example, if both air flows are received simultaneously within the terminal unit, and the mixed air flow may be output to the conditioned space.

In some embodiments, the terminal unit may use the plenum air flow to supplement the primary air flow, for example, to increase the volume of air flow supplied to the conditioned space and/or to utilize heated or cooled air within the plenum space. In a further example, the air within the plenum space may be heated or cooled from various surrounding elements, such as walls, people in the conditioned space, equipment within the structure, and/or from an air flow, such as a previously-supplied primary air flow, that has traveled into the plenum space. Thus, the air within the plenum space may provide auxiliary heating or cooling to the conditioned space along with or instead of primary air flow.

The plenum air flow may be received through a plenum air inlet of the terminal unit. However, sounds generated from the primary air flow passing through the ductwork, sounds generated from the plenum and/or primary air flow passing into, out of, or through the terminal unit, and/or sounds corresponding to other equipment, such as fans, diffusers, valves, or auxiliary heat exchangers, may radiate out of the terminal unit via the plenum air inlet, thereby causing undesired noise. As such, in some embodiments, a plenum door panel may be adjusted to regulate the size of the plenum air inlet, for example, to a reduced size in order to cause a reduction in the radiated noise. For example, the size of the plenum air inlet may be reduced or closed entirely by the plenum door panel based on a desired amount of plenum air to be output to the conditioned space via the terminal unit.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10. However, the HVAC unit 12 may be located in other equipment rooms or areas adjacent the building 10. The HVAC unit 12 may be a single packaged unit containing other equipment, such as a blower, heat exchangers, integrated air handler, and/or auxiliary heating unit. In other embodiments, the HVAC unit 12 may be part of a split HVAC system, which includes an outdoor HVAC portion and an indoor HVAC portion.

The HVAC unit 12 is an air cooled device that implements a refrigeration cycle to provide conditioned air to the building 10. Specifically, the HVAC unit 12 may include one or more heat exchangers across which an air flow is passed to condition the air flow before the primary air flow is supplied to the building. In the illustrated embodiment, the HVAC unit 12 is a rooftop unit (RTU) that conditions a supply air stream, such as environmental air and/or a return air flow drawn from the building 10. After the HVAC unit 12 conditions the air flow, the air flow, also referred to herein as a primary air flow, is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air flow and a furnace for heating the air flow. The primary air flow supplied to the building 10 by the HVAC unit 12 may include environmental air, such as air from outside the building 10, and/or recirculated air from within the building 10, which may or may not be actively and/or passively heated or cooled by the HVAC unit 12. For example, the HVAC unit 12 may operate in a recirculating or economizer mode, such that the supply air flow, and thus the primary air flow, is not actively heated or cooled.

A control device 16, one type of which may be a thermostat, may be used to designate a desired temperature of a conditioned space 18 within the building 10. The control device 16 also may be used to control the flow of air, such as volume, through the ductwork 14 to different areas within the conditioned space 18. For example, the control device 16 may be used to regulate operation of one or more components of the HVAC unit 12 or other components, such as dampers, fans, and/or terminal units 20 within the building 10 that may control the flow of air through and/or from the ductwork 14. In some embodiments, other devices may be included in the system, such as pressure and/or temperature transducers or switches that sense the temperatures and pressures of the conditioned air, return air, and so forth. Moreover, the control device 16 may include computer systems that are integrated with or separate from other building control or monitoring systems, including systems that are remote from the building 10.

As discussed above, a plenum air flow may be drawn from a plenum space 22. In some embodiments, the plenum space 22 may facilitate transfer of return air back to the HVAC unit 12. For example, the plenum space 22 may be above a drop ceiling 24 that separates the plenum space 22 from the conditioned space 18. Moreover, in some embodiments, the terminal unit 20 may be implemented in the building 10 without the drop ceiling 24, and the plenum air flow may be drawn from a portion of air near the ceiling of the conditioned space 18.

Figure 2:
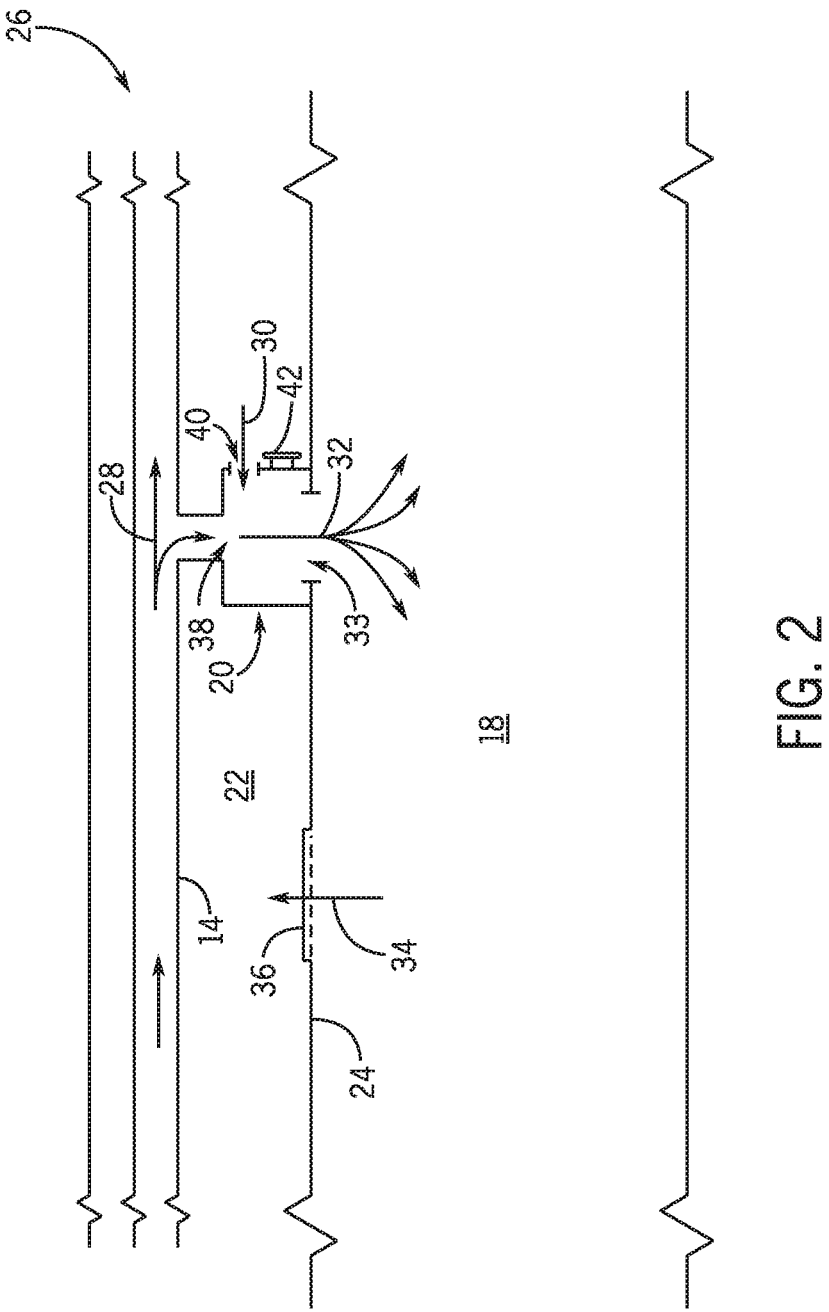
FIG. 2 is a schematic of a an embodiment of a portion of the building of FIG. 1, illustrating air flow to a conditioned space via a terminal unit, in accordance with aspects of the present disclosure.

FIG. 2 is a schematic diagram of an embodiment of a portion 26 of the building 10, illustrating an embodiment of the terminal unit 20 implemented within the building 10. As discussed above, the terminal unit 20 may receive a primary air flow 28, via ductwork 14, and a plenum air flow 30 from the plenum space 22. In the illustrated embodiment, the terminal unit 20 includes a primary air inlet 38 configured to receive the primary air flow 28 and a plenum air inlet 40 configured to receive the plenum air flow 30. The terminal unit 20 is configured to mix the primary air flow 28 and the plenum air flow 30 to generate a mixed air flow 32 that is then supplied to the conditioned space 18 via an air outlet 33. In some implementations, the plenum space 22 may receive a return air flow 34, for example, drawn into the plenum space 22 via a vent 36. The return air flow 34 may then be subsequently returned to the HVAC unit 12 for conditioning or may be drawn into the terminal unit 20 as the plenum air flow 30 via the plenum air inlet 40. As discussed herein, the mixed air flow 32 may include the primary air flow 28 and/or the plenum air flow 30. For example, if the primary air inlet 38 of the terminal unit 20 or the plenum air inlet 40 of the terminal unit 20 is closed, the mixed air flow 32 may include air from a single source. In other words, if the primary air inlet 38 is closed, the terminal unit 20 may receive and supply the plenum air flow 30 alone to the conditioned space 18, and if the plenum air inlet 40 is closed, the terminal unit 20 may receive and supply the primary air flow 28 alone to the conditioned space 18.

The size of the air flow path through the plenum air inlet 40 may be regulated by a plenum door panel 42 adjustably affixed to the terminal unit 20. For example, the plenum door panel 42 may be motorized to enable actuation between a fully open state, a fully closed state, and a plurality of partially closed states therebetween. Depending on operating conditions, the plenum door panel 42 may be closed or partially closed to reduce noise radiated from the terminal unit 20.

Figure 3:
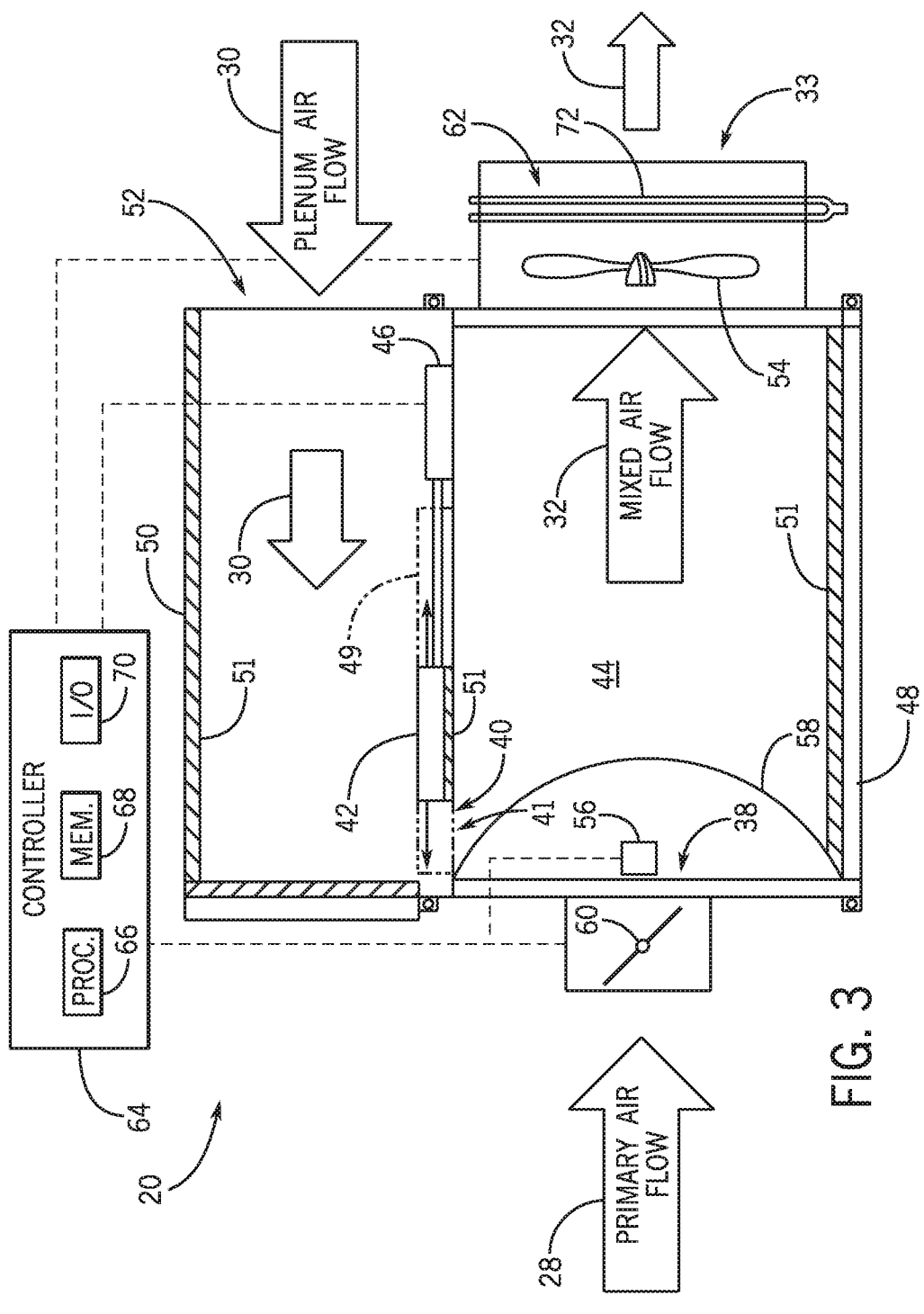
FIG. 3 is a top cross-sectional view of an embodiment of the terminal unit with a sound attenuator and a controller for use with the terminal unit, in accordance with aspects of the present disclosure.

To help further illustrate, an embodiment of the terminal unit 20 having the adjustable plenum door panel 42 is shown in FIG. 3. As discussed further below, the plenum door panel 42 is configured to be actuated to adjust a size of an air flow path 41 through the plenum air inlet 40. In general, the plenum air inlet 40 may be sized to intake up to 100 percent of the desired output flow of the mixed air flow 32 into a mixing chamber 44 of the terminal unit 20. However, in some circumstances, the volume of air received through the plenum air inlet 40 may be less than 100 percent of the mixed air flow 32 output from the terminal unit 20. For example, 25 percent, 50 percent, 75 percent, or 100 percent of the mixed air flow 32 may stem from the plenum air flow 30 entering into the mixing chamber 44 via the plenum air inlet 40, and a remaining portion or percentage of the mixed air flow 32 may be composed of the primary air flow 28 entering the terminal unit 20 via the primary air inlet 38. As will be appreciated, the particular amounts or portions of the primary air flow 28 and the plenum air flow 30 that are combined to generate the mixed air flow 32 may be based on various operating parameters, such as a temperature of the primary air flow 28, a temperature of the plenum air flow 30, a measured temperature of the conditioned space 18, a temperature set point of the conditioned space 18, and so forth. When a desired amount of plenum air flow 30 as a component of the mixed air flow 32 is less than 100 percent, the size of the air flow path 41 through the plenum air inlet 40 may be reduced in order to reduce noise associated with or generated by the air flows entering the terminal unit 20. As such, in accordance with present techniques, the plenum door panel 42 may be moved between multiple different positions by an actuator 46 to adjust the size of the air flow path 41 through the plenum air inlet 40 to minimize the noise radiated from the plenum air inlet 40 while also enabling a desired amount of the plenum air flow 30 to flow into the mixing chamber 44.

The plenum door panel 42 and the actuator 46 may include any suitable components and may be of any suitable arrangement for changing the size of the air flow path 41 through the plenum air inlet 40. For example, the plenum door panel 42 and/or the actuator 46 may be coupled to a housing 48 of the terminal unit 20 defining the mixing chamber 44, where the housing 48 includes the plenum air inlet 40 and the primary air inlet 38. The plenum door panel 42 and the actuator 46 may be disposed within the housing 48 or may be external to the housing 48. In one embodiment, the housing 48 and the plenum door panel 42 may be formed of the same material, such as sheet metal. The plenum door panel 42 may be disposed along a track 49 affixed to the housing 48, and the actuator 46 may be configured to move the plenum door panel 42 along the track 49 to adjust a size of the air flow path 41 through the plenum air inlet 40. Indeed, the plenum door panel 42 may be sized to enable complete occlusion or blockage of the plenum air inlet 40 when no plenum air flow 30 into the mixing chamber 44 is desired. Further, the plenum door panel 42 and the actuator 46 may be positioned, such as along the track 49 coupled to the housing 48, to enable full retraction of the plenum door panel 42 from the plenum air inlet 40 when 100 percent of plenum air flow 30 into the mixing chamber 44 is desired.

The actuator 46 may be a linear actuator, rotary actuator, or other suitable actuator for facilitating movement of the plenum door panel 42 within, behind, and/or in front of the plenum air inlet 40, relative to a flow direction of the plenum air flow 30 through the plenum air inlet 40. For example, the actuator 46 may translate the plenum door panel 42 horizontally or vertically and/or rotate the plenum door panel 42. Additionally, in some embodiments, the plenum door panel 42 may include multiple sections and/or expand and contract in an accordion-like manner. Furthermore, depending on implementation, multiple actuators 46 may also be used to actuate one or more plenum door panels 42. The actuator 46 may include a motor, a chain, linkages, or any other suitable components to enable movement of the plenum door panel 42. In some embodiments, the actuator 46 may include a stepper motor and/or a sensor to measure the position of the plenum door panel 42 relative to the plenum air inlet 40. It should be noted that the plenum door panel 42 and the actuator 46 may have any other suitable configurations to enable adjustment of the size of the plenum air inlet 40. For example, the plenum door panel 42 may be part of a valve such as a butterfly valve, ball valve, or other suitable fluid control valve.

In some embodiments, the terminal unit 20 may also include a sound attenuator 50 coupled to the housing 48 or integrated with the housing 48 and adjacent to the mixing chamber 44 as an additional sound reducing feature. The sound attenuator 50 may define an introductory or initial flow path to enable the plenum air flow 30 to reach the plenum air inlet 40 while attenuating sounds reverberated out of the plenum air inlet 40. For example, the sound attenuator 50 may use geometric sound damping and/or a sound attenuating material 51 disposed within. Moreover, in some embodiments, the plenum door panel 42 and/or the interior of the housing 48, such as within the mixing chamber 44, may also have sound attenuating material 51 disposed thereon.

Depending on implementation, the terminal unit 20 may include the plenum door panel 42, the sound attenuator 50, or both. For example, in implementations where more sound reduction is desired, the terminal unit 20 may include both the plenum door panel 42 and the sound attenuator 50. Additionally, in embodiments where the sound attenuator 50 may not be suitable due to space constraints or limitations, the plenum door panel 42 may be implemented on the terminal unit 20 without the sound attenuator 50. In embodiments of the terminal unit 20 including the sound attenuator 50, the plenum door panel 42 and/or the actuator 46 may be disposed at an attenuator opening 52 to enable adjustment of a size of the air flow path 41 for the plenum air flow 30 at the attenuator opening 52.

In some embodiments, the plenum door panel 42 and actuator 46 may be retrofitted to an existing terminal unit. For example, the actuator 46 and plenum door panel 42 may be affixed to the exterior of an existing terminal unit via one or more fasteners, such as screw or rivets. Additionally or alternatively, the existing terminal unit may be replaced by the terminal unit 20 with the plenum door panel 42 and actuator 46 already installed. Because the terminal unit 20 with the plenum door panel 42 can be utilized with or without the sound attenuator 50, the terminal unit 20 may have a similar form factor to that of the existing terminal unit it replaces. As such, existing HVAC systems may be retrofitted with, and new installations may be fitted with, terminal units 20 employing the movable plenum door panel 42 to decrease noise associated with the air flows into and through the terminal unit 20.

The terminal unit 20 may also include additional components, such as a fan 54, one or more sensors 56, an air diffuser 58, a primary inlet valve 60, and/or an auxiliary conditioner 62. The operation of these components is discussed in further detail below. Moreover, a controller 64 may regulate operation of the terminal unit 20 to provide desired conditioning to the conditioned spaces 18 of the building 10 via the mixed air flow 32 based on one or more operating parameters. The operating parameters may include a user setting, which may be received via the control device 16 discussed above, and/or operating conditions monitored by the controller 64, such as temperatures and/or static pressures of the primary air flow 28, plenum air flow 30, and mixed air flow 32, as may be measured by the one or more sensors 56. The controller 64 may include one or more processors 66, one or more memory devices 68, such as a non-transitory machine readable media, and/or one or more input/output (I/O) interfaces 70, which may be configured to communicate with the control device 16, the one or more sensors 56, the fan 54, the primary inlet valve 60, the auxiliary conditioner 62, and/or the actuator 46. Furthermore, the controller 64 may be implemented as part of the control circuitry of the HVAC unit 12 or may be implemented separately as stand-alone circuitry, such as local or remote to the terminal unit 20.

The fan 54 of the terminal unit 20 may draw the primary air flow 28 and/or plenum air flow 30 into the mixing chamber 44, promote mixing of the primary air flow 28 and plenum air flow 30 to generate the mixed air flow 32, and/or force the mixed air flow 32 out of the terminal unit 20 toward the conditioned space 18. As should be appreciated, the primary air flow 28 may be forced into the mixing chamber 44, for example via blowers of the HVAC unit 12, and/or may be drawn into the mixing chamber 44 via the fan 54. Additionally, the primary inlet valve 60 may regulate the primary air flow 28 into the mixing chamber 44. Operation of the primary inlet valve 60 may be regulated by the controller 64 based on an operating parameter, such as a thermostat or zoning setting. In some embodiments, the fan 54 may also motivate the mixed air flow 32 across the auxiliary conditioner 62, which may be disposed adjacent to the outlet 33 of the terminal unit 20. The auxiliary conditioner 62 may include heating and/or cooling capabilities. For example, the auxiliary conditioner 62 may include a heat exchanger having coils 72 configured to circulate a heated or chilled fluid therethrough. Additionally or alternatively, the auxiliary conditioner 62 may include an electric heating element for heating the mixed air flow 32 prior to discharge of the mixed air flow 32 from the terminal unit 20.

In some embodiments, the speed of the fan 54 may correspond to a desired volumetric flow rate of the mixed air flow 32 discharged by the terminal unit 20. To this end, the one or more sensors 56 may measure the amount of the primary air flow 28 received by the mixing chamber 44, and the amount of plenum air flow 30 received via the plenum air inlet 40 may be calculated by the difference between the amount of mixed air flow 32 and the amount of primary air flow 28. For example, the one or more sensors 56 may directly measure a flow rate of the primary air flow 28 and/or measure the static pressure of the primary air flow 28 relative to the pressure within the mixing chamber 44 or relative to the pressure downstream of the terminal unit 20. From these measurements, a desired volumetric flow rate of the plenum air flow 30 received by the terminal unit 20 may be determined. Based on the desired amount of plenum air flow 30 to be received by the terminal unit 20, the controller 64 may control the size of the air flow path through the plenum air inlet 40 to enable a desired volumetric flow rate of plenum air flow 30 into the terminal unit 20 while also reducing noise reverberating out of the plenum air inlet 40. In other words, based on the desired amount of plenum air flow 30 to be received by the terminal unit 20, a position of the plenum door panel 42 may be selected or determined that enables a flow of the desired amount of plenum air flow 30 into the terminal unit 20 and that also reduces reverberation of noise out of the plenum air inlet 40. In some embodiments, an empirically-determined look-up table associating flow rates of the primary air flow 28, static pressure measurements of the primary air flow 28, flow rates of the plenum air flow 30, and/or positions of the plenum door panel 42 may be stored in the memory 68 of the controller 64. Based on measurement of one or more operating parameters, the controller 64 may reference the look-up table to determine a desired position of the plenum door panel 42.

Figure 4:
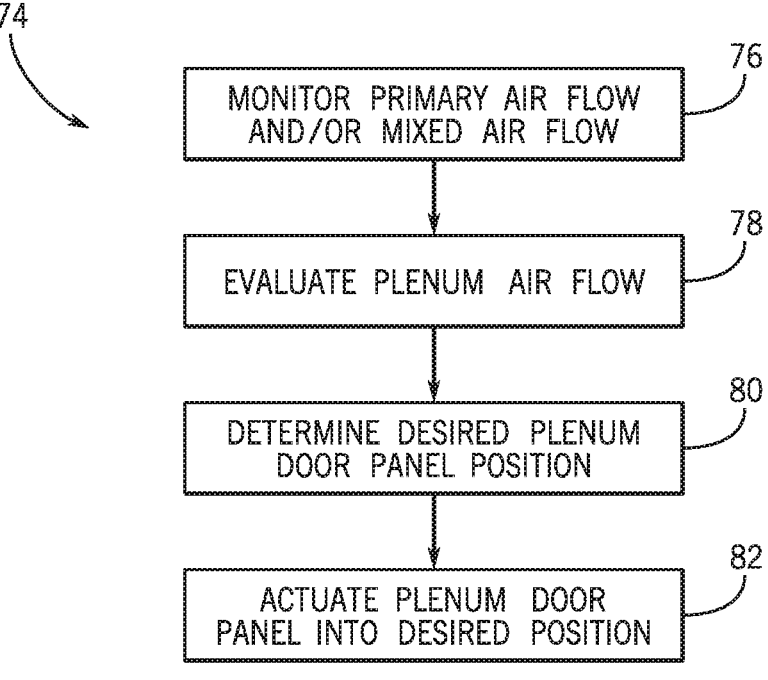
FIG. 4 is a flowchart of an embodiment of a process for operating the terminal unit, in accordance with aspects of the present disclosure.

FIG. 4 is a flowchart 74 of an embodiment of a process for operating the terminal unit 20. As discussed herein, the controller 64 may monitor operating parameters of the primary air flow 28 and/or the mixed air flow 32, as indicated by process block 76. For example, via feedback received from the sensors 56, the controller 64 may monitor temperatures, pressures, flow rates, or other parameters of the primary air flow 28 and/or the mixed air flow 32. Based on parameters of the primary air flow 28 and/or the mixed air flow 32, the controller 64 may determine a desired flow rate or amount of the plenum air flow 30 to be received by the terminal unit 20, as indicated by process block 78. As an example, the controller 64 may determine a desired amount of the plenum air flow 30 to be included in the mixed air flow 32 based on a temperature of the plenum air flow 30, a temperature of the primary air flow 28, a flow rate of the primary air flow 28, a static pressure of the primary air flow 28 at the primary inlet valve 60, a temperature set point of the conditioned space 18, and/or a desired temperature of the mixed air flow 32. Based on the desired amount of plenum air flow 30 to be received into the mixing chamber 44 of the terminal unit 20, the controller 64 may determine a desired or suitable position of the plenum door panel 42, as indicated by process block 80. For example, the controller 64 may reference a look-up table stored in the memory 68 to determine or select an empirically-determined position of the plenum door panel 42 based on the desired amount of plenum air flow 30 and/or based on other operating parameters. The plenum door panel 42 may then be actuated to the desired position to enable the desired flow rate of plenum air flow 30 into the terminal unit 20, while reducing radiated sound from the terminal unit 20, as dictated process block 82.

As discussed above, the desired position of the plenum door panel 42 may be determined based on the desired volume of the plenum air flow 30 to be received into the terminal unit 20. However, in order to maintain the desired volume of air through the reduced size of the air flow path 41, the velocity of the plenum air flow 30 through the plenum air inlet 40 may increase. As such, depending on the volume of the plenum air flow 30 and the position of the plenum door panel 42, the increased velocity of the plenum air flow 30 may produce as much or more noise than would be reduced by the partial closure of the plenum door panel 42. As such, the position of the plenum door panel 42 may be determined such that the total noise, including noise associated with the primary air flow 28 and the noise associated with the plenum air flow 30, reverberated from the terminal unit 20 is minimized. Furthermore, as discussed herein, the desired position of the plenum door panel 42 may be determined based on a thermostat setting and/or the monitored state of the terminal unit 20, for example via periodic or continuous monitoring of the plenum air flow 30, the primary air flow 28, and/or the static pressure of the primary air flow 28.

Additionally or alternatively, the speed of the fan 54 and/or the voltage supplied to the fan 54 may be monitored and used via the controller 64 to determine the desired position of the plenum door panel 42. For example, a relatively low signal voltage, such as two volts, may correspond to a low fan speed, while a relatively high signal voltage, such as 10 volts may correspond to a high fan speed. As should be appreciated, the voltage levels and corresponding fan 54 speeds may be dependent on implementation and are given as non-limiting examples. Further, the fan 54 speed may correlate to the volume of the mixed air flow 32. Further, even if the volume of the primary air flow 28 is unknown, an estimate of the plenum air flow 30 may be made based on the speed of the fan 54 or signal indicative thereof. As such, at low fan 54 speeds and, thus, relatively low volumes of plenum air flow 30, the plenum door panel 42 may be positioned to reduce the air flow path 41 more than at high fan 54 speeds, which may correspond to relatively high volumes of plenum air flow 30.

Figures 5, 6, 7:
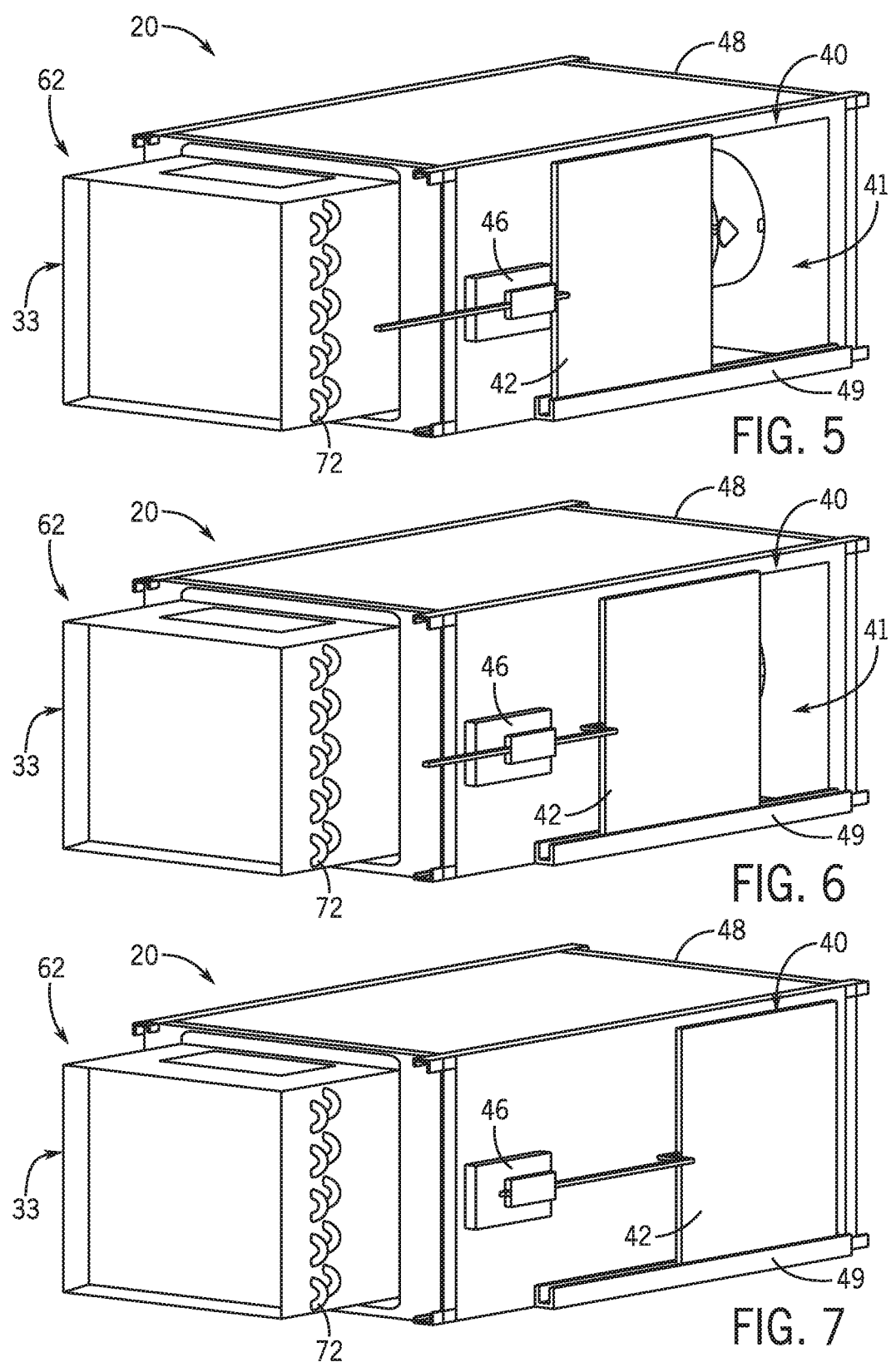
FIG. 5 is a perspective view of an embodiment of the terminal unit with a plenum door panel open, in accordance with aspects of the present disclosure.
FIG. 6 is a perspective view of an embodiment of the terminal unit with the plenum door panel partially closed, in accordance with aspects of the present disclosure.
FIG. 7 is a perspective view of an embodiment of the terminal unit with the plenum door panel closed, in accordance with aspects of the present disclosure.

FIGS. 5, 6, and 7 are perspective views of an embodiment of the terminal unit 20 without the sound attenuator 50 and with the plenum door panel 42 in a fully open position, partially closed position, and fully closed position, respectively. In some embodiments, when the plenum door panel 42 is fully open, the air flow path 41 of the plenum air inlet 40 may be approximately equal in size to the opening of the plenum air inlet 40 formed in the housing 48. As the plenum door panel 42 is closed, such that the plenum door panel 42 overlaps with the plenum air inlet 40, the size of the air flow path 41 may decrease. Moreover, when the plenum door panel 42 is fully closed, such as when the plenum door panel 42 substantially completely overlaps with the plenum air inlet 40, the air flow path 41 may be completely blocked by the plenum door panel 42, and the plenum air flow 30 may not be permitted to flow through the plenum air inlet 40. Further, in some embodiments, the actuator 46 may position the plenum door panel 42 to one of multiple set or predetermined positions. For example, the controller 64 may associate a range of plenum air flow volumes and/or fan speeds to a set number of predetermined positions. Moreover, in some embodiments, the actuator 46 may have a full range of motion to position the plenum door panel 42 at any position along the plenum air inlet 40.

As discussed herein, noise associated with the flow of air into and/or out of the terminal unit 20 may be minimized by reducing the air flow path 41 though the plenum air inlet 40. As such, the plenum door panel 42 of the terminal unit 20 may be actuated to a determined position to decrease the size of the air flow path 41 and reduce the noise reverberated from the terminal unit 20 through the plenum air inlet 40. Additionally, in some embodiments, the terminal unit may also include sound attenuating material 51 and/or a sound attenuator to further reduce noise.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A terminal unit for a heating, ventilation, and/or air conditioning (HVAC) system, comprising:

a housing defining a mixing chamber including a primary air inlet, a plenum air inlet, and a mixed air outlet, wherein the mixing chamber is configured to mix a primary air flow from the primary air inlet with a plenum air flow from the plenum air inlet to form a mixed air flow that is output through the mixed air outlet to a conditioned space;

a panel adjustably coupled to the housing, wherein the panel is configured to adjustably occlude the plenum air inlet;

an actuator coupled to the housing and the panel, wherein the actuator is configured to move the panel to adjust a size of an air flow path corresponding to the plenum air inlet;

a controller configured to determine a position of the panel corresponding to a reduced noise output of the terminal unit, wherein the controller is configured to determine the position of the panel corresponding to the reduced noise output of the terminal unit based on measured feedback; and a sensor configured to measure a static air pressure of the primary air flow, wherein the measured feedback comprises the static air pressure.

2. The terminal unit of claim 1, comprising a sound attenuator coupled to an exterior surface of the housing about the plenum air inlet, wherein the sound attenuator includes an inlet configured to receive the plenum air flow, and the sound attenuator is configured to direct the plenum air flow to the plenum air inlet of the housing.

3. The terminal unit of claim 1, comprising a sound attenuating material disposed on the panel.

4. The terminal unit of claim 1, comprising:

an auxiliary coil coupled to the housing and configured to condition the mixed air flow; and a fan disposed within the housing and configured to motivate air flow through the housing.

5. The terminal unit of claim 1, wherein the reduced noise output of the terminal unit comprises a minimized summation of a first noise and a second noise, wherein the first noise is associated with the primary air flow and the second noise is associated with the plenum air flow, wherein the plenum air flow is non-zero.

6. The terminal unit of claim 1, wherein the controller is configured to regulate operation of the actuator based on additional measured feedback, wherein the additional measured feedback includes a signal voltage of a fan, wherein the fan is configured to motivate air flow through the housing.

7. The terminal unit of claim 1, wherein the actuator is a linear actuator configured to slide the panel along the plenum air inlet.

8. The terminal unit of claim 7, wherein the panel is configured to slide along a track coupled to the housing.

9. The terminal unit of claim 1, wherein the terminal unit is configured to draw the plenum air flow into the mixing chamber from a plenum space located above a drop ceiling.

10. The terminal unit of claim 1, comprising a primary inlet valve configured to regulate a flow rate of the primary air flow into the mixing chamber.

11. The terminal unit of claim 1, wherein the controller is configured to select the position, from a plurality of predefined panel positions, having a smallest noise output of the plurality of predefined panel positions.

12. A terminal unit for a heating, ventilation, and/or air conditioning (HVAC) system, comprising:

a housing defining a mixing chamber including a primary air inlet, a plenum air inlet, and a mixed air outlet, wherein the mixing chamber is configured to mix a primary air flow from the primary air inlet with a plenum air flow from the plenum air inlet to form a mixed air flow that is output through the mixed air outlet to a conditioned space;

a panel adjustably coupled to the housing, wherein the panel is configured to adjustably occlude the plenum air inlet;

an actuator coupled to the housing and the panel, wherein the actuator is configured to move the panel to adjust a size of an air flow path corresponding to the plenum air inlet; and a controller configured to determine a position of the panel corresponding to a reduced noise output of the terminal unit, wherein the reduced noise output of the terminal unit comprises a minimized summation of a first noise and a second noise, wherein the first noise is associated with the primary air flow and the second noise is associated with the plenum air flow, wherein the plenum air flow is non-zero.

\* \* \* \* \*